United States Patent [19]

Kido et al.

[11] 4,104,208

[45] Aug. 1, 1978

[54] PROCESS FOR PREPARATION OF HARD AND POROUS POLYVINYLALCOHOL GELS

[75] Inventors: Shiro Kido, Hoya; Yuji Saito, Yokohama; Toshinao Iwaeda, Tokuyama, all of Japan

[73] Assignee: Toyo Soda Manufacturing Co., Ltd., Japan

[21] Appl. No.: 746,532

[22] Filed: Dec. 1, 1976

[30] Foreign Application Priority Data

Mar. 9, 1976 [JP] Japan ............................ 51-24693

[51] Int. Cl.² .................................................. C08J 9/00
[52] U.S. Cl. ......................................... 521/53; 526/9; 526/10; 210/31 C; 260/29.6 B; 521/63; 521/141
[58] Field of Search .................. 260/2.5 R; 526/9, 10

[56] References Cited

U.S. PATENT DOCUMENTS

| | | | |
|---|---|---|---|
| 3,640,734 | 2/1972 | Oppenheimer et al. | 526/9 |
| 3,896,092 | 7/1975 | Epton et al. | 260/2.5 R |

*Primary Examiner*—Harold D. Anderson
*Assistant Examiner*—Regenia F. Hughes
*Attorney, Agent, or Firm*—Oblon, Fisher, Spivak, McClelland & Maier

[57] ABSTRACT

A process for the preparation of hard and porous polyvinylalcohol gels for aqueous gel permeation chromatography, comprises suspension-polymerizing vinyl acetate with diethylene glycol dimethacrylate or glycidyl methacrylate in the presence of a diluent which controls pore size of the product as a crosslinking agent, saponifying the resulting porous polyvinyl acetate gel with an alkali, and subjecting the resulting porous polyvinylalcohol gel to post-crosslinking with epichlorohydrin.

4 Claims, No Drawings

PROCESS FOR PREPARATION OF HARD AND POROUS POLYVINYLALCOHOL GELS

BACKGROUND OF THE INVENTION

1. Field of the Invention

The present invention relates to a process for preparing hard and porous polyvinylalcoh ol gels. More particularly, the invention relates to a process for the preparation of hard polyvinylalcohol gels for aqueous gel permeation chromatography.

2. Description of the Prior Art

Polystyrene gels and polyvinyl acetate gels are now used as a column packing material for gel permeation chromatography (GPC) using organic solvents. Polyacrylamide gels, dextran gels, starch gels and agar gels are used as the packing material for GPC using aqueous solvents. The packing material used with organic solvents are hard porous gels. However, the packing material used with aqueous solvents become soft as the pore size is increased. This is a great hindrance to enhancing the operation speed in aqueous GPC.

Herein, the term "hard gel" refers to a gel having a structure in which the pore size is large (for example, 100 to 100,000 Å) for the gel in the dry state. Moreover, this large pore size is not significantly changed by swelling of the gel. In contrast, for a "soft gel", the pore size is very small in the dry state and is made larger when the gel is swollen with the aqueous solvent.

The cause of the softness of the packing material for aqueous GPC resides mainly in the packing material-preparation process. The pore structure of these packing materials is different from the pore structure of the packing material for organic GPC.

For preparation of the packing material for organic GPC, an organic diluent is added to a monomer and a crosslinking agent. The mixture is subjected to suspension polymerization in an aqueous medium. Pores are formed at those parts from which the diluent has escaped. Therefore, the degree of crosslinking and the pore size can be controlled easily, and a hard gel can be obtained. For preparation of the packing material for aqueous GPC, however, a water-soluble polymer is used as the starting material and is subjected to post-crosslinking to form pores. The pore size is controlled by adjusting the molecular weight of the starting polymer and the proportion of the crosslinking agent. That is, if the amount of the crosslinking agent is reduced, the size of the pores formed by crosslinking after swelling is increased. Accordingly, it is impossible to increase the pore size while retaining the hardness of the gel. Therefore, only soft gels are now available.

Polyvinylalcohol gels have been proposed as the packing material for aqueous GPC, and two processes for production of such polyvinylalcohol gels are known in the art. However, each of these polyvinylalcohol gels suffer from the defects mentioned above for the conventional packing material for aqueous GPC.

More specifically, according to one process, a soft gel is prepared by inverse suspension polymerization of polyvinylalcohol by using epichlorohydrin as a crosslinking agent; and according to the other process, monomeric vinyl acetate is polymerized in the presence of the sole additive, glycidyl methacrylate as a crosslinking agent. The resulting polymer is saponified with an alkali to form a polyvinylalcohol gel. According to these processes, however, it is still impossible to appropriately control both the strength of the gel and the pore size in combination. The products obtained by these processes are no better than the conventional soft gels and a need continues to exist for desirably hard gels for use in aqueous GPC.

SUMMARY OF THE INVENTION

Accordingly, it is an object of the present invention to provide a process for preparing hard and porous polyvinylalcohol gels that can be used effectively as the packing material for high speed GPC using an aqueous medium.

Briefly, these and other objects of the present invention as will hereinafter become clear have been attained by providing a process for the preparation of hard and porous polyvinylalcohol gels for aqueous gel permeation chromatography, which comprises suspension-polymerizing vinyl acetate in the presence of a diluent which is capable of controlling the pore size and in the presence of a crosslinking agent of diethylene glycol dimethacrylate or glycidyl methacrylate; saponifying the resulting porous polyvinyl acetate gel with an alkali; and subjecting the resulting porous polyvinylalcohol gel to post-crosslinking with epichlorohydrin.

DETAILED DESCRIPTION OF THE PREFERRED EMBODIMENTS

According to the process of the present invention, monomeric vinyl acetate is suspension-polymerized in the presence of a diluent capable of controlling the pore size while using a diethylene glycol dimethacrylate or glycidyl methacrylate as a crosslinking agent. Thereby, a porous vinyl acetate polymer having a desirable pore size is attained. The resulting polymer is saponified with sodium hydroxide or the like. During this saponification step, the bound crosslinking agent is severed, forming a soft gel. However, this porous polyvinylalcohol gel has a hard, porous gel structure whose pores are formed by escape of the diluent from the polymer. The gel obtained is then reacted with epichlorohydrin as a crosslinking agent in the presence of an alkali.

In order for a gel to be effectively used as the packing material for aqueous gel permeation chromatography, the gel must be hydrophilic. Accordingly, the nature of the crosslinking agent and monomer used to convert to the polymer is extremely restricted compared to the case of the packing material for organic GPC. Consequently, in the present invention, a vinyl ester of a carboxylic acid having a group capable of being converted to a hydrophilic group by hydrolysis, especially vinyl acetate, is preferably employed as the monomer constituting the skeleton of the gel. Further, diethylene glycol dimethacrylate or glycidyl methacrylate, each of which results in a hydrophilic polymer and is highly copolymerizable with monomeric vinyl acetate, is used as the crosslinking agent.

Suitable diluents, for use in combination with the foregoing monomer and crosslinking agent for control of the pore size, include, for example, isoamyl alcohol, toluene, nitromethane, n-amyl alcohol and the like.

The proportions of diluent, monomer and crosslinking agent may be chosen as desired. The pore size of the gel is determined by the relative amount of diluent used. In general, as the amount of diluent is increased, the pore size becomes larger, and the volume occupied by pores is increased, with the result that the gel becomes fragile. Therefore, in general, the weight ratio of the amount of diluent relative to the weight of the mixture of the monomer and crosslinking agent should be in the range of from 50 : 100 to 250 : 100, preferably from 100 : 100 to 200 : 100.

The weight ratio between the amount of monomer and the amount of crosslinking agent also has an influence on the pore size. In order to obtain a hard gel, the weight ratio of monomer to crosslinking agent should be in the range of from 90 : 10 to 30 : 70, preferably from 70 : 30 to 30 : 70.

If the post-crosslinking agent, namely epichlorohydrin, is used in an amount of at least 2% by weight based on the amount of the preliminarily crosslinked polyvinylalcohol (after saponification), the effects of this invention can be attained. Generally, it is preferred that the amount of epichlorohydrin be 2 to 20%, especially 5 to 20% by weight on the same basis.

The pore size of the porous polyvinylalcohol gel prepared according to this invention is the same as the pore size of the starting porous polyvinyl acetate gel. The starting porous polyvinyl acetate gel can be used as the packing material for GPC of saccharides such as dextran. Accordingly, this relationship has been confirmed by using the starting gel and the final gel as the packing material for GPC and comparing the results obtained.

Having generally described the invention, a more complete understanding can be obtained by reference to certain specific examples, which are included for purposes of illustration only and are not intended to be limiting unless otherwise specified.

EXAMPLE 1

A mixture of 60 g of vinyl acetate, 40 g of diethylene glycol dimethacrylate, 150 g of nitromethane and 1 g of benzoyl peroxide was suspension-polymerized at 60° C in 2l of water for 5 hours to obtain a porous polyvinyl acetate. The polymer was saponified by refluxing for 5 hours in a mixture of 2l of methanol and 200 ml of a 2.0N aqueous solution of sodium hydroxide. The product was reacted with a mixture of 1l of methanol, 100 ml of a 2.0N aqueous solution hydroxide and 10 g of epichlorohydrin by refluxing for 4 hours. The product was washed with water and methanol and dried. The gel having a particle size of 300 to 400 mesh was packed in a column having an inner diameter of 7.5 mm and a length of 60 mm, and standard dextran was fractionated at a flow rate of 1.5 ml/min by using water as a solvent.

When the measurement was carried out using a conventional Sephadex the packing material, since the maximum flow rate attainable was about 15 ml/hour, it took about 2 hours to complete the measurement. When the gel of the present invention of Example 1 was used, the measurement was completed in about 20 minutes and a higher separation capacity was obtained.

EXAMPLE 2

In accordance with the process of Example 1 except for varying the amount of epichlorohydrin from 10 g to 2 g, a gel was produced and standard dextran was separated by using the gel.

The pore size of the gel was slightly larger than that of the gel of Example 1 but the resolution was substantially the same.

In comparison with the gel of Example 1, the pressure loss was higher. When the flow rate was higher than 2.5 ml/min., the pressure loss gradually increased to a point at which it was not measurable.

Example 3

In accordance with the process of Example 1 except for varying the amount of epichlorohydrin from 10 g to 20 g, a gel was produced, and the standard dextran was separated by using the gel.

The pressure loss was substantially the same as that of Example 1.

The pore size of the gel was slightly smaller than that of Example 1.

EXAMPLE 4

In accordance with the process of Example 1 except for replacing diethyleneglycol dimethacrylate with glycidyl methacrylate, a gel was produced and the standard dextran was separated by using the gel.

The result was substantially the same as that of Example 1.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the preparation of hard and porous polyvinyl alcohol gels for aqueous gel permeation chromatography, which comprises:
    suspension-polymerizing a mixture of vinyl acetate and at least one crosslinking agent selected from the group consisting of diethylene glycol dimethacrylate and glycidyl methacrylate, in the presence of a diluent, wherein the weight ratio of the amount of said diluent to the amount of said mixture of vinyl acetate and crosslinking agent is in the range of from 50 : 100 to 250 : 100, and the weight ratio of the amount of said vinyl acetate to the amount of said crosslinking agent is in the range of from 90 : 10 to 30 : 70.
    saponifying the resulting porous polyvinyl acetate gel with an alkali; and
    subjecting the resulting porous polyvinyl alcohol gel to postcrosslinking with epichlorohydrin.

2. The process of claim 1 wherein said diluent is a member selected from the group consisting of isoamyl alcohol, toluene, nitromethane and n-amyl alcohol.

3. The process of claim 1 wherein the amount of epichlorohydrin is 2 to 20% by weight based on the amount of polyvinylalcohol produced by the saponification.

4. The hard, porous polyvinylalcohol gel prepared by the process of claim 1.

* * * * *